Sept. 15, 1964 H. L. KARIG 3,148,546
STATIC WHEEL BALANCER
Filed Oct. 9, 1961
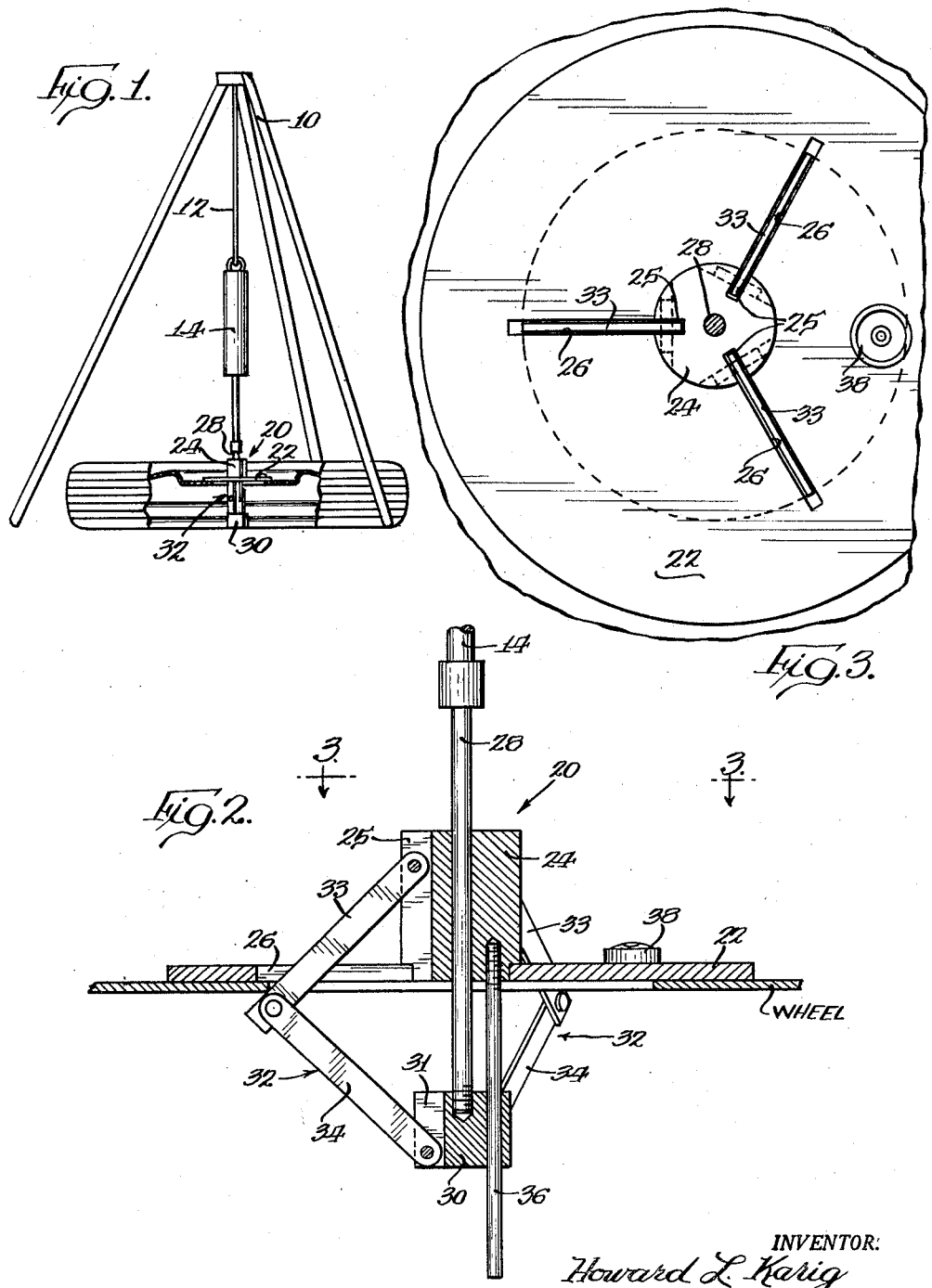
INVENTOR:
Howard L. Karig
BY
Gary, Desmond & Parker
Atty's

United States Patent Office 3,148,546
Patented Sept. 15, 1964

3,148,546
STATIC WHEEL BALANCER
Howard L. Karig, 167 Fellows Court, Elmhurst, Ill.
Filed Oct. 9, 1961, Ser. No. 143,836
8 Claims. (Cl. 73—486)

The present invention relates to balance indicating apparatus for vehicle wheels, and particularly, to an improved process of and apparatus for indicating the balance or unbalance of heavy duty vehicle wheels, such as truck, tractor and earth mover wheels.

The major problem in balancing the wheels of heavy duty vehicles resides in the inability of an operator, or even several operators, to manipulate the larger heavy assembly of wheel and tire. The problem arises in respect of highway transport trucks, and is even more magnified in the massive wheels of bulldozers, motor graders and other earth movers. Yet these vehicles travel thousands of miles in the course of their work, and balancing of the wheels to improve riding and steering qualities, and more importantly to increase tire life, is just as significant in such vehicles as in passenger cars, if not more so.

The object of the present invention is to provide an improved process of and improved apparatus for balancing heavk duty or massive vehicle wheels in a most convenient, expeditious, practical and economical manner.

Specifically, it is an object of the invention to provide a process facilitating the balancing of a heavy duty vehicle wheel; the wheel being removed from the vehicle and laid horizontally on the ground, and the process comprising the steps of coupling a statically balanced wheel carrier to the wheel centrally thereof, lifting the carrier and wheel and suspending the same for free tilting movement in generally horizontal position by force applying means coupled centrally to the carrier, and observing spirit level means provided on the carrier.

Another object of the invention is to provide improved wheel carrier means suspended from and actuated by the force applying or wheel lifting means for automatically centering the carrier relative to the wheel and coupling the same to the wheel.

A further object of the invention is the provision of improved wheel balancing apparatus comprising a wheel carrier including a balanced plate to be engaged with the central portion of a vehicle wheel, a plurality of collapsible and extensible centering arms disposed symmetrically about the plate and depending therebelow, and an actuating rod extending slidably through the plate and coupled to said arms below the plate, the arms being collapsible to permit the same to be passed through the center hole of the wheel to permit the plate to be engaged with the wheel, the rod being connected to the wheel lifting means and upon application of force thereto first extending the arms to engage the lower surface of the wheel, center the plate relative to the center hole in the wheel and interconnect the wheel and the carrier, and thereafter causing the wheel to be raised with the carrier to a generally horizontal freely tiltable position wherein spirit level means on the upper surface of the plate may be observed to ascertain whether the wheel is balanced or unbalanced, and if the latter, to facilitate balancing thereof.

Other objects and advantages of the invention will become apparent in the following detailed description.

Now, in order to acquaint those skilled in the art with the manner of making and using my wheel balancing apparatus, and with the manner of practicing my improved process, I shall describe, in connection with the accompanying drawings, a preferred embodiment of the apparatus of the invention and the preferred manner of making and using the same.

In the drawings:
FIGURE 1 is a side view of a preferred embodiment of the wheel balancing apparatus of my invention showing the apparatus during the initial stages of association with a wheel, portions of the wheel being broken away to reveal the apparatus;

FIGURE 2 is a vertical section, on an enlarged scale, of the wheel carrier means of the invention showing the same coupled to the central portion of a vehicle wheel; and FIGURE 3 is a plan view of the carrier taken substantially on line 3—3 of FIGURE 2.

As shown in FIGURE 1, the preferred embodiment of the apparatus of the invention includes a portable standard or tripod 10, which may be provided with casters to enhance its portability. Depending from the apex of the tripod is a suspension string 12 universally connected to the tripod and including a force applying means 14. The means 14 is illustrated herein as comprising a hydraulic jack or pneumatic motor, but the same may take the form of substantially any manual or automatic lifting device affording a single operator sufficient mechanical advantage to accommodate lifting of vehicle wheels to be balanced. In like manner, the tripod 10 may be replaced by any customary support for a lifting device of the general character. Thus, the suspension and lifting assembly could, for example, comprise a mechanical chain hoist and supporting track of the type found in many garages, and other suitable suspending means as will be obvious to those skilled in the art.

Irrespective of its form, the suspension and lifting assembly 10–12–14 universally supports in freely depending relation a wheel carrier and balancing assembly, indicated generally at 20. As best shown in FIGURES 2 and 3, the assembly 20 preferably includes as its main element a horizontally disposed circular plate 22 that is statically balanced about its central axis. This plate is of a diameter larger than the center hole but smaller than the rim diameter of the wheels to be balanced, whereby the plate may be butted flush against the upper or outer surface of the central portion of vehicle wheels, as shown in FIGURES 1 and 2. Fixed to the plate coaxially thereof is an elongate upstanding hub 24 having a plurality of symmetrically disposed vertically extending radial slots 25 in its peripheral surface. The plate 22 is also provided with symmetrically arranged radially extending slots 26 aligned respectively with the slots 25. An actuating rod 28 extends slidably through an axial bore in the hub 24 and carries at its lower end a mounting member or collar 30 having radial slots 31 therein corresponding to and aligned respectively with the slots 25 and 26. The slots 25, 26 and 31 are at least three in number and are disposed at equal circumferential spacings about the plate, hub and collar, thereby to maintain the symmetry and static balance of the assembly.

Disposed within each set of aligned slots is a multiple link collapsible and extensible arm 32 preferably comprised of two pivotally connected links 33 and 34 each of which is pivotally connected at its free end within a respective slot in a respective one of the hub and collar members 24 and 30. The upper link 33 of each pair extends downwardly through the plate 22, through a respective slot 26, and is of a length relative to its pivot such that the effective radial dimension thereof when extended is preferably greater than the radial dimension of the slot 26. As will appear, the links 33 comprise means for centering the carrier 20 relative to the wheel and for coupling the carrier to the wheel, and for this reason these links are preferably formed of hardened steel or the like, while the links 34 may be formed of more economical material having sufficient mechanical strength to sustain the load (essentially compression) imposed thereon.

Assuming the plate 22 to be stationary, it will be appreciated that vertically downward movement of the rod 28 and collar 30 from the position shown in FIGURE 2 will result in straightening or radially collapsing the arms 32, while upward movement of the rod results in bending or radially extending the arms. While the slots 26 in the plate 22 together with the axial bore in the hub 24 may provide adequate guidance for the movable components of the carrier, i.e., the rod, collar and arms, I prefer to provide additional guidance in the form of one or more relatively short guide rods 36 secured to the hub 24 and extending slidably through the collar 30 parallel to but eccentrically of the rod 28. The guide rod thus restricts the components to vertical movement and retains the same against relative rotation whereby wear of the plate 22 at the margins of the slots 26 and bending of or damage to the links 33 and 34 is prevented.

To complete the carrier 20, spirit level means 38 is mounted on the upper surface of the plate 22 in an accessible, readily viewable position. The means 38 could if desired take the form of two elongate spirit level tubes disposed at right angles to one another, but I prefer to employ a single spherical leveling vial the bubble of which is universally movable to reveal directly the direction of wheel unbalance if any.

If necessary, a counterbalance may be applied to the plate 22 to compensate for the eccentric mounting of the guide rod 36 and spirit level 38, thereby to provide a carrier 20 which of itself will be essentially in static balance with the plate 22 horizontal when the carrier is suspended from a vertical support.

The thus constituted carrier 20 is then suspended from the support and actuating means 10-12-14 by coupling the actuating rod 28 thereof to the suspension string 12 and its force applying means 14. If the string 12 does not otherwise include a universal joint, the rod 28 is universally coupled to the string, but if the string does include a universal joint, as provided at the apex of the tripod 10, the rod 28 may, as herein shown, be rigidly coupled to the piston of the jack 14.

In use of the apparatus of the invention, and therefore in practice of the process of the invention, the tire and wheel assembly to be balanced is laid in an accessible position on the ground or the floor, and the tripod or support 10 is wheeled or otherwise placed over the same with the apex of the tripod generally aligned with the center hole in the wheel. The suspension string 12 is then extended, by extending the jack 14, to lower the carrier 20 to the wheel. The operator will then raise the plate 22 manually to cause straightening, i.e., radial collapsing, of the arms 32, whereafter the collar 30, rod 28 and arms 32 may be lowered downwardly through the center hole in the wheel until the plate 22 contacts the upper surface of the wheel. The operator may place his foot lightly on the plate 22 to hold the same on the wheel, and then operate the jack 14 to cause the same to raise the rod 28.

As the actuating rod 28 is raised upwardly relative to the plate 22, the same causes relative upward movement of the lower ends of the links 34, whereby the arms 32 are expanded radially. This causes the links 33 to engage the center hole of the wheel, whereupon the links, being at least three in number, shift the carrier 20 into axially aligned relationship with the wheel. As the rod continues to move upwardly, the links 33 become physically clamped to the wheel, whereupon the jack 14 raises the carrier and the wheel vertically upwardly to a desired position spaced above floor level.

In this position, the wheel is suspended from its central axis for free tilting movement. If the wheel is in balance, it will assume a horizontal position and this fact will be revealed by location of the bubble centrally in the spherical vial 38. If the wheel is out of balance, the out of balance mass or masses will cause the wheel to tilt downwardly at the locus of the unbalancing masses, which fact will be revealed by observation of the wheel and the leveling vial 38. The wheel may then be balanced by resting counterbalancing wheel weights on the wheel rim at a point thereon opposite the "down side" of the wheel until balance is achieved as revealed by centering of the bubble in the vial. The wheel may then be lowered to the ground by manipulation of the jack 14, whereafter the counterbalancing weights may be hammered into place on the wheel rim.

To separate the carrier 20 from the wheel, it is only necessary to lower the wheel to the ground and to continue extending the jack 14 until the rod 28 fails to move further. The operator may then operate the jack in the lifting direction while simultaneously lifting the plate 22, whereupon the arms 32, now in their radially collapsed position, will be withdrawn from the wheel. Thereafter, the support or tripod 10 may be moved away to permit handling of the wheel in any customary manner.

From the foregoing, it is apparent that the present invention provides a process and apparatus for balancing heavy duty vehicle wheels easily and accurately with a minimum of effort and by a single operator. Consequently, the objects and advantages of the invention have been shown herein to be attained in a convenient, economical and practical manner.

While I have shown and described what I regard to be the preferred embodiment of my invention, it will be appreciated that various changes, rearrangements and modifications may be made therein without departing from the scope of the invention, as defined by the appended claims.

I claim:

1. A process of determining the balance of heavy duty vehicle wheels by operations carried out entirely from above the wheels while they are lying flat on the floor, comprising the steps of coupling a statically balanced wheel carrier centrally to a wheel from the upper surface of the wheel when it is lying flat on the floor, lifting the carrier from above by force applying means suspended above and universally coupled centrally to the carrier to raise the wheel off the floor and suspend the same for free tilting movement in generally horizontal position, and observing level indicating means on the carrier.

2. A process of determining the balance of heavy duty vehicle wheels by operations carried out entirely from above the wheels when they are lying flat on the floor, comprising the steps of engaging a plate statically balanced about its axis and carrying level indicating means flush against the upper central surface area of a vehicle wheel lying flat on the floor, centering the plate relative to the wheel, connecting the plate to the wheel from above the wheel by extending connecting means downwardly through the wheel and engaging the same with the wheel while it is lying flat on the floor, and lifting the plate from above to raise the wheel off the floor and suspend the same for free tilting movement in generally horizontal position by force applying means pivotally suspended above and universally coupled to the axis of said plate.

3. Apparatus for determining the balance of vehicle wheels, comprising a wheel carrier including a balanced plate to be engaged with the central portion of the upper surface of a vehicle wheel, a plurality of collapsible and extensible centering arms disposed symmetrically about the plate and depending therebelow for passage through the center hole in the wheel, an actuating rod extending slidably through the plate and coupled at its lower end to said arms below the plate, for extending said arms into engagement with lower surface portions of the wheel level means on said plate, and suspension means suspended vertically above said plate and including a universal joint and means coupled to the upper end of said rod for raising and lowering said rod, said plate and the wheel.

4. Apparatus for determining the balance of vehicle wheels comprising a plate balanced about an axis therethrough and having a plurality of symmetrically arranged radial slots therein, a coaxial hub on said plate, a rod extending slidably through said hub axially thereof, a mounting member on one end of said rod, a plurality of multiple link arms pivotally connected at their opposite ends to said member and to the hub at the side of said plate opposite said member, said arms being disposed symmetrically about the axis of said plate and extending through respective ones of said slots, and spirit level means on said opposite side of said plate.

5. Apparatus for determining the balance of vehicle wheels comprising a plate balanced about an axis therethrough and having a plurality of symmetrically arranged radial slots therein, a coaxial hub on said plate, a rod extending slidably through said hub axially thereof, a mounting member on one end of said rod, a plurality of multiple link arms pivotally connected at their opposite ends to said member and to the hub at the side of said plate opposite said member, said arms being disposed symmetrically about the axis of said plate and extending through respective ones of said slots, spirit level means on said opposite side of said plate, and suspension means coupled to the other end of said rod.

6. Apparatus for determining the balance of vehicle wheels as set forth in claim 5, wherein said suspension means includes a universal coupling and force applying means for raising and lowering said rod and said plate.

7. Apparatus for determining the balance of vehicle wheels comprising a circular plate having a plurality of symmetrically arranged radial slots therein, a coaxial hub on said plate, a rod extending slidably through said hub axially thereof, a coaxial mounting member on one end of said rod, a plurality of arms each comprised of a pair of pivotally connected links pivotally connected at their opposite ends to said member and to the hub at the side of said plate opposite said member, said arms being disposed symmetrically about the axis of said plate and extending through respective ones of said slots, and a spherical leveling vial on said opposite side of said plate.

8. Apparatus for determining the balance of vehicle wheels comprising a plate balanced about an axis therethrough and having a plurality of symmetrically arranged radial slots therein, a coaxial hub member on said plate, an actuator rod extending slidably through said hub axially thereof, a mounting member on one end of said rod, a guide rod secured to one member and extending slidably through the other member eccentrically of said axis, a plurality of multiple link arms pivotally connected at their opposite ends to said mounting member and to the hub member at the side of said plate opposite said mounting member, said arms being disposed symmetrically about the axis of said plate and extending through respective ones of said slots, and spirit level means on said opposite side of said plate.

References Cited in the file of this patent

UNITED STATES PATENTS

| | | |
|---|---|---|
| 1,735,713 | Alltop | Nov. 12, 1929 |
| 2,262,811 | McDaniels | Nov. 18, 1941 |
| 2,301,958 | Lannen | Nov. 17, 1942 |
| 2,502,633 | Shepard | Apr. 4, 1950 |
| 2,698,537 | Taylor et al. | Jan. 4, 1955 |
| 2,879,667 | Henderson | Mar. 31, 1959 |
| 2,902,862 | Twiford | Sept. 8, 1959 |
| 2,909,063 | Bageman | Oct. 20, 1959 |
| 2,951,725 | St. Jean | Sept. 6, 1960 |